United States Patent [19]

Thomas et al.

[11] Patent Number: 5,027,392
[45] Date of Patent: Jun. 25, 1991

[54] SPEAKER DRIVE ARRANGEMENT FOR LOUDSPEAKER TELEPHONE

[75] Inventors: Terence N. Thomas; Marc E. Bonneville, both of Nepean; Douglas C. Wadsworth, Manotick, all of Canada

[73] Assignee: Northern Telecom Limited, Montreal, Canada

[21] Appl. No.: 378,777

[22] Filed: Jul. 12, 1989

[51] Int. Cl.$^5$ ............................................. H04M 1/60
[52] U.S. Cl. ................................... 379/388; 379/390; 379/395
[58] Field of Search ............... 379/388, 395, 390, 389, 379/413

[56] References Cited

U.S. PATENT DOCUMENTS

| | | | |
|---|---|---|---|
| 4,376,876 | 3/1983 | Versteeg et al. | 379/388 X |
| 4,640,493 | 3/1987 | Whittaker | 379/395 X |
| 4,731,831 | 3/1988 | Cosgrove et al. | 379/388 |
| 4,856,057 | 8/1989 | Snith et al. | 379/388 |

OTHER PUBLICATIONS

Signetics Corporation, 5556 Operational Amplifier, 1972, Signetics Component catalog, pp. 6–142 through 6–144.

*Primary Examiner*—James L. Dwyer
*Assistant Examiner*—M. Shehata
*Attorney, Agent, or Firm*—Foley & Lardner

[57] ABSTRACT

In a loudspeaker telephone, improved power transfer is achieved by connecting the drive circuit for the loudspeaker in parallel with the input and output of the usual series regulator, the output of the regulator and one of the power supply connections of the drive circuit being connected, in common, to supply other circuitry in the telephone set. This other circuitry might comprise a microprocessor and other signal processing circuitry. Such a configuration means that the current passing through the speaker drive circuit also passes through the other circuitry. In effect, it is "re-used" instead of being added, as would be the case if the drive circuit were connected in parallel with the other circuitry. In the case of a positive series regulator, the series regulator supplies current when the current requirement of the other circuitry exceeds that received from the drive circuit. When the current from the drive circuit exceeds that required by the other circuitry, the series regulator is arranged to sink the excess current. A suitable push-pull regulator may comprise a power operational amplifier.

10 Claims, 3 Drawing Sheets

SPEAKER DRIVE ARRANGEMENT FOR LOUDSPEAKER TELEPHONE

FIELD OF THE INVENTION

This invention relates to telephone sets and especially to telephone sets having a loudspeaker.

BACKGROUND

It is becoming increasingly commonplace for telephone sets to have loudspeakers. In the majority of modern telephone sets, the usual bell has been replaced by a loudspeaker which generates a warble or other tone. In some telephone sets, the so-called hands-free sets, a loudspeaker is provided for use in place of the usual handset receiver. In either case, the loudspeaker may draw a significant current compared with that drawn by the remaining telephone circuitry, which typically is fabricated using metal-oxide semiconductor (MOS) technology. In most cases, the current drawn by the loudspeaker and other circuitry in the set will be supplied from the central office by way of the subscriber loop. Any increase in this current will lead to a greater power loss due to the impedance of the loop, which may be quite large if the loop is long. Any reduction in current requirements would be beneficial, to allow either longer loops or more circuitry in the telephone set.

SUMMARY OF THE INVENTION

According to the present invention a telephone set comprises means for connecting the set to a subscriber line, a loudspeaker, a drive circuit for the loudspeaker, other circuitry, and a series regulator connected in series between the connection means and such other circuitry. The drive circuit has its power supply connections connected in parallel with the input and output of the series regulator such that the output of the series regulator and one of the power supply connections of the drive circuit are connected in common to the other circuitry. The series regulator is arranged to supply or absorb current depending upon the current requirement of the other circuitry.

When a positive series regulator is used, the regulator will supply current when the current required by the other circuitry exceeds that received from the drive circuit, and will absorb current when the current from the drive circuit exceeds that required by the other circuitry. Conversely, when a negative series regulator is used, it will absorb current when the current requirement of the other circuitry exceeds that of the drive circuit, and supply current when the current requirement of the drive circuit exceeds that of the other circuitry.

An advantage of this arrangement is that the current passing through the drive circuit is "re-used" for the current through the other circuitry, or vice versa, rather than being added to it as would happen if the drive circuit were in parallel with the other circuitry.

BRIEF DESCRIPTION OF THE DRAWINGS

An embodiment of the invention will now be described by way of example only and with reference to the accompanying drawings, in which.

DETAILED DESCRIPTION OF THE PREFERRED EMBODIMENT

Figure 1:
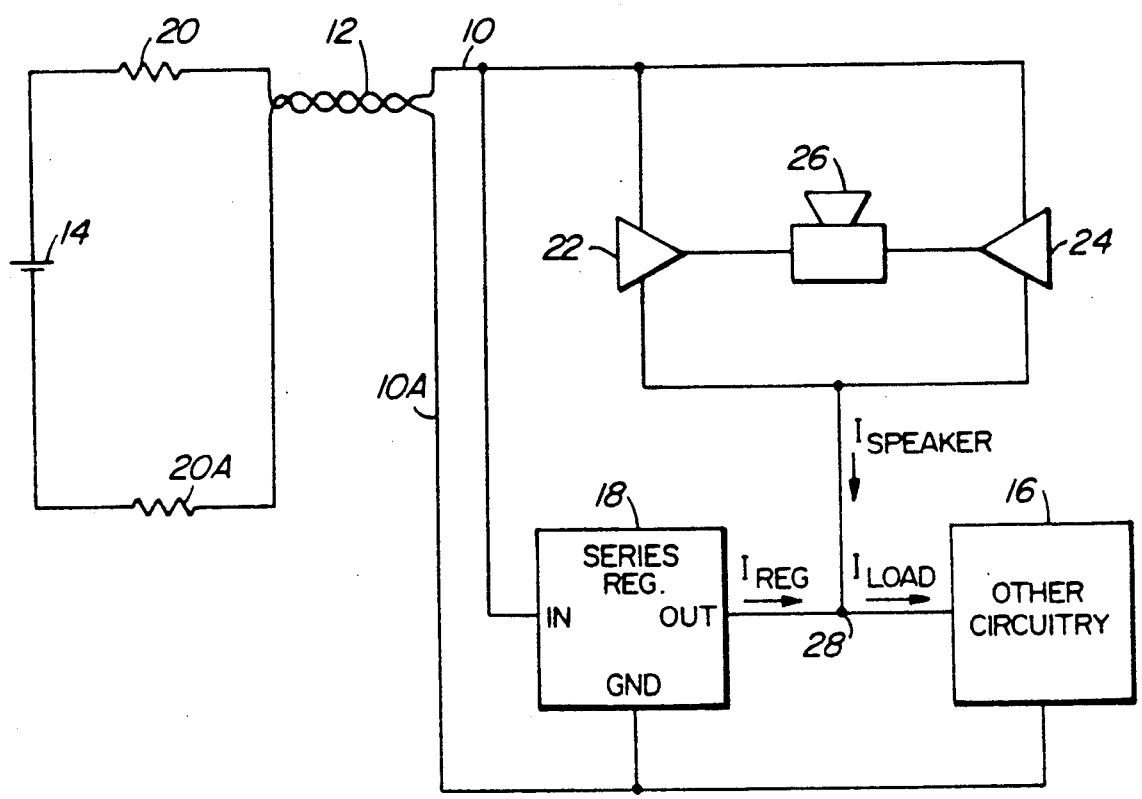
FIG. 1 is a block schematic diagram of a portion of circuitry of a telephone set with a positive series voltage regulator.

Referring now to FIG. 1, a telephone set comprises means, in the form of a termination 10, 10A, for connecting the telephone set to a subscriber loop 12. The subscriber loop 12 connects the set to a central office where it is terminated at a line card (not shown). The line card is represented by a voltage source 14 which applies a voltage, typically 19–48 volts depending upon the system, to the subscriber loop 12 to power the telephone set. For the purposes of this description only this power supply voltage will be considered, the usual communications signals which also pass between the line card and the telephone set via the subscriber loop being of no relevance. Likewise, the other circuitry within the telephone set, such as a microprocessor and various integrated circuits for signal processing, is represented simply as load 16.

A series regulator 18 is disposed between the termination 10 and 10A and the load 16 and serves to regulate the voltage from the subscriber loop 12.

In conventional loudspeaker-type telephone sets, the drive circuit for the loudspeaker would usually be connected between ground and either the input or the output of the series regulator 18. In either case, the current drawn by the speaker drive circuit is added to the load current, i.e. the current drawn by the aforesaid other circuitry. This leads to increased losses in the impedance, represented by resistors 20 and 20A, of the subscriber loop 12. In a conventional system, this loop impedance might be as much as 1200 ohms.

In FIG. 1, a speaker drive circuit is shown to comprise a pair of speaker amplifiers 22 and 24, respectively, each with its signal output connected to the loudspeaker 26. The signal input terminals of each of the speaker amplifiers 22 and 24 are not shown connected to other circuitry but will in practice be connected to a source of ringing tones and, in certain cases such as hands-free units, voice signals. The positive power supply terminals of the amplifiers 22 and 24 are connected in common to the loop termination 10 and the corresponding negative power supply terminals connected in common to the output of the series regulator 18. Hence, so far as power supply is concerned, the drive amplifiers 22 and 24, for loudspeaker 26, are connected in parallel with the input and output terminals of the series regulator 18.

The series regulator 18 is capable of supplying current or absorbing (sinking) it. When the current drawn by the load 16 is less than the current through the drive amplifiers 22 and 24, the series regulator 18 will absorb the difference. When the current required by the load 16 is greater than that supplied by the drive amplifiers 22 and 24, the series regulator 18 supplies the difference.

The current required by the speaker drive amplifiers 22 and 24, for example when a ringing tone is generated, may be comparable with that required by the load 16. The current drawn by the speaker drive amplifiers 22 and 24 will supply the load 16 rather than being additional to the load current. Instead of supplying both the loudspeaker current and the load current, as would be the case if they were in parallel, the series regulator 18 need only supply or sink the difference. Hence the current requirements for the telephone set are significantly reduced.

Figure 2:
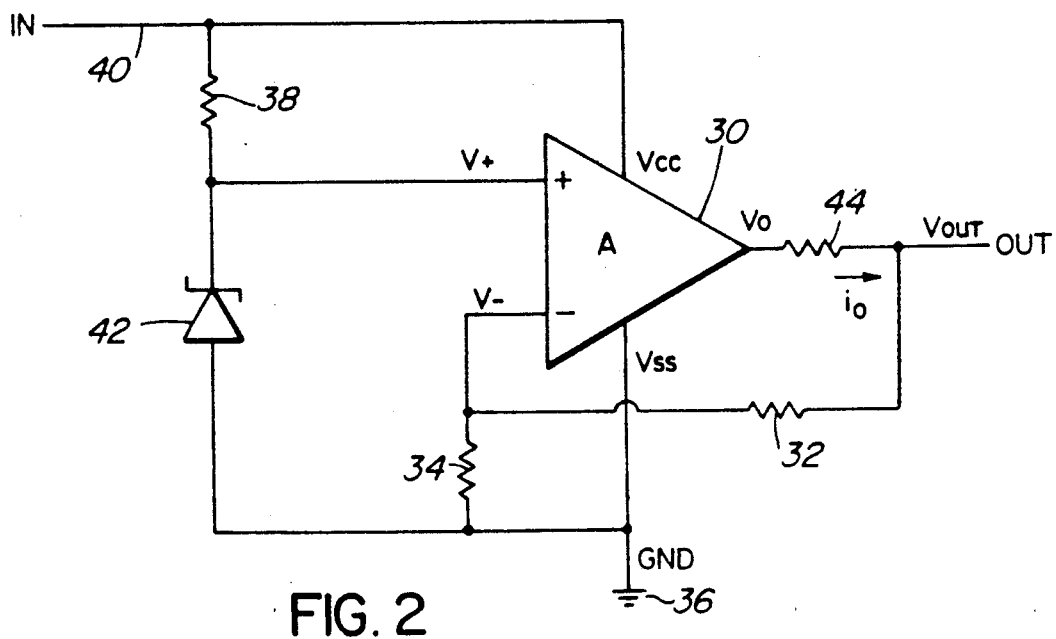
FIG. 2 is a detail block diagram of the regulator of the telephone set.

Referring now to FIG. 2, the push-pull series regulator 18 comprises an amplifier 30, which is a power operational amplifier with a gain A of about 100,000 at low frequencies. A resistor 32 is connected between the output and the inverting input of the amplifier 30 and a second resistor 34 is connected between the inverting input and a ground 36. Resistors 32 and 34 form the negative feedback connection of the amplifier. A reference diode 42, conveniently a bandgap reference diode, connected between the non-inverting input of the amplifier 30 and ground, serves to maintain the voltage at 1.235 volts. A third resistor 38 is connected between the non-inverting input of the amplifier 30 and a supply rail 40 to supply the necessary current to the reference diode. The open loop output impedance of the amplifier 30 is represented by a resistor 44. It should be noted that this resistor 44 is not a real resistor and will be used later to explain regulator operation. The values of resistor 32 and resistor 34 are chosen to be in the ratio 3.049:1 so as to give an output voltage of 5 volts. Whether the amplifier 30 is sourcing or sinking current, the voltage $V_{out}$ will remain substantially constant.

Figure 3:
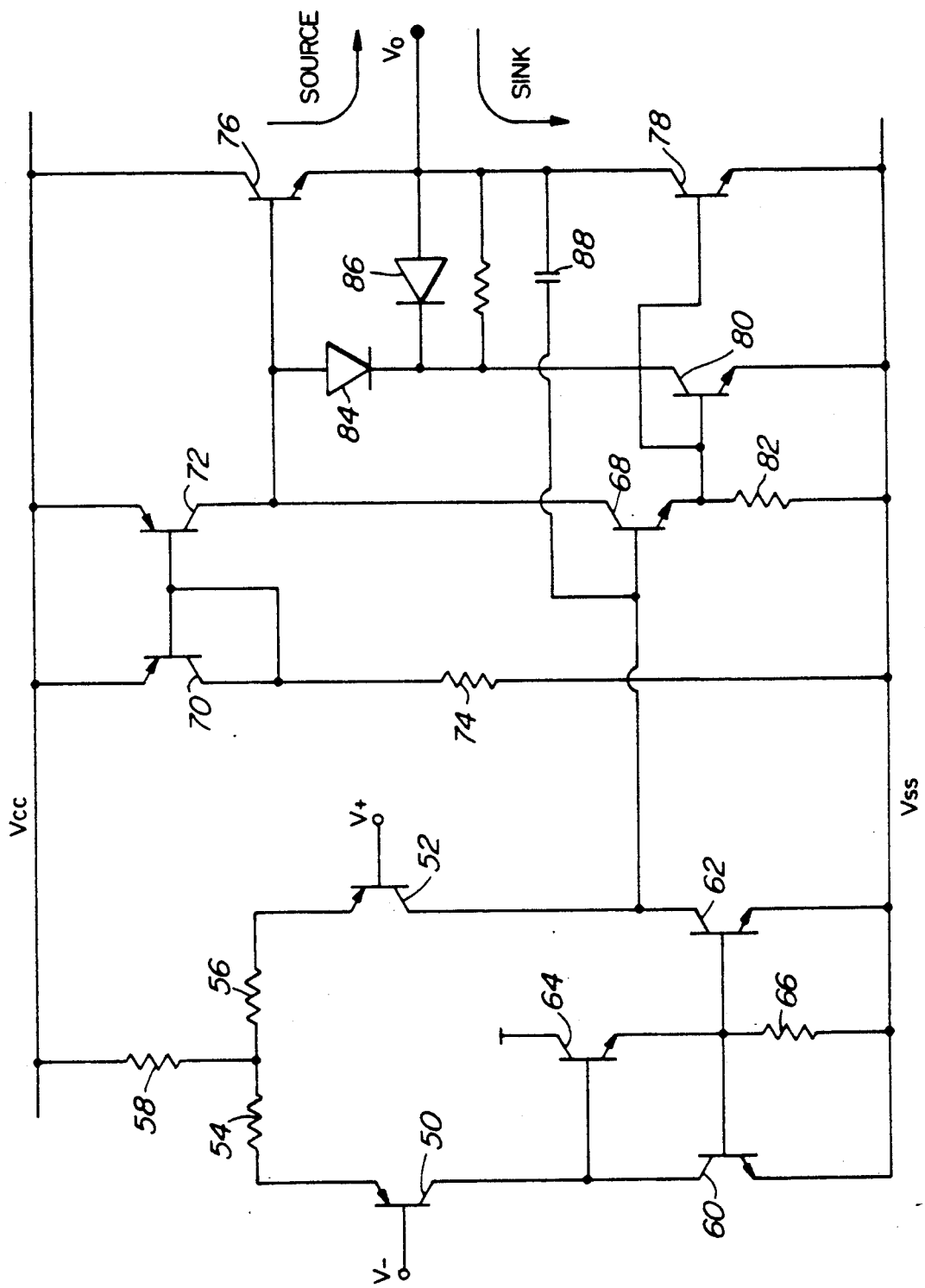
FIG. 3 is a more detailed view of an amplifier used in the regulator of FIG. 2.

The amplifier 30 should be stable with capacitive loads. Referring now to FIG. 3, which shows the amplifier 30 in more detail, two transistors 50 and 52 form an emitter-coupled pair. The base of transistor 50 constitutes the inverting input V− and the base of transistor 52 constitutes the non-inverting input V+. The emitters of transistors 50 and 52 are connected by resistors 54 and 56, respectively, in common, to a supply resistor 58 which is connected to the supply rail $V_{cc}$. Each of the collectors of transistors 50 and 52 is connected to a respective one of the collectors of a pair of transistors 60 and 62, which have their emitters connected to a reference voltage rail $V_{ss}$ which, as can be seen from FIG. 2, is connected to ground. A transistor 64 has its collector connected to the supply rail $V_{cc}$, its base connected to the collector of transistor 50, and its emitter connected to the bases of transistors 60 and 62. A resistor 66 connects the bases of transistors 60 and 62, and the emitter of transistor 64, to the reference voltage rail $V_{ss}$. Transistors 60, 62 and 64 form an active load for transistors 50 and 52, forming with them a differential amplifier stage.

The collectors of transistors 52 and 62, which constitute the output of the differential amplifier, are coupled to the base of a transistor 68, which constitutes an emitter-follower that reduces the loading effect of transistor 80 upon the output of the active load. Two transistors 70 and 72 have their emitters connected to the supply rail $V_{cc}$ and their bases coupled in common to the collector of transistor 70, which is also connected to the reference level $V_{ss}$ by a resistor 74. Transistor 70 is connected as a diode, and the bias current flowing through it will also flow through transistor 72 which is a current mirror.

The collectors of transistors 68 and 72, respectively, are connected in common to the base of a transistor 76 which, when conducting, sources current to the output terminal $V_o$. The collector of transistor 76 is coupled to the supply rail $V_{cc}$, and its emitter to the collector of a transistor 78 which has its emitter connected to the reference level $V_{ss}$. When conducting, transistor 78 serves to sink current from the output terminal $V_o$. The base of transistor 78 is connected, in common with the base of a transistor 80 and the emitter of transistor 68, to ground by way of a resistor 82. Transistor 78, the "sink" transistor, derives bias current by way of transistor 72 and transistor 68.

Transistor 80 is a common emitter amplifier providing voltage gain. Its collector is coupled to the cathodes of a pair of diodes 84 and 86 which have their anodes connected to, respectively, the collector of transistor 72 and to the output $V_o$. Capacitor 88, connected between the collector of transistor 78 and the base of transistor 68, provides compensation for stability.

Referring again to FIGS. 1 and 2, the current flowing through the speaker amplifiers, $I_{speaker}$, will vary in dependence upon the input voice or ringing signal—if the signal is very high, $I_{speaker}$ will be high. Applying the current law to the node 28 at the output of the regulator 18, $I_{load}$ is equal to the sum of $I_{reg}$ and $I_{speaker}$. Assuming that the current from the speaker drive amplifiers 22 and 24 is greater than that required by the load, the regulator current, $I_{reg}$, will flow into the regulator 18. When this happens the voltage $V_{out}$ at the output OUT of the regulator 18 will try to increase because of open loop output impedance 44. (FIG. 2). As soon as the output voltage $V_{out}$ starts to go up, say a fraction of a volt, the voltage V− will also increase due to the divider formed by resistors 32 and 34. Consequently the output $V_o$ of the amplifier 30 will be driven down such that voltage $V_{out}$ stays relatively constant at 5 volts. Conversely, if current $I_{reg}$ is sourced, the voltage $V_{out}$ will try to fall, and the feedback loop will cause a reduction in V−, with an increase in the amplifier output voltage $V_o$, such that voltage $V_{out}$ stays relatively constant.

Hence the voltage $V_{out}$ at the output of the regulator 18 will be maintained at a constant 5 volts and current will flow into or out of the amplifier output as required. In a typical application $I_{speaker}$ can be anywhere between zero and 60 milliamps. When the "other circuitry 16" is fabricated using CMOS technology, a typical requirement may be about 40 milliamps, so the regulator will be required to absorb current at times.

Embodiments of the invention lead to better power efficiency, even in "hands-free" telephones where the voice signal might only need about 20 milliamps.

Although a line card voltage in the range of 19–48 volts has been mentioned, 48 volts being in respect of a conventional telephone system, the invention will be especially advantageous in telephone systems such as those marketed under the trade marks NORSTAR and MERIDIAN by Northern Telecom Limited, which involve line voltages of 19 volts and 30 volts respectively, and loop resistances between zero and 200 ohms.

It has been found that amplifier 30 may conveniently be one "half" of an MC 34119 device manufactured by Motorola Semiconductors Inc. of Phoenix, Ariz.

Figure 4:
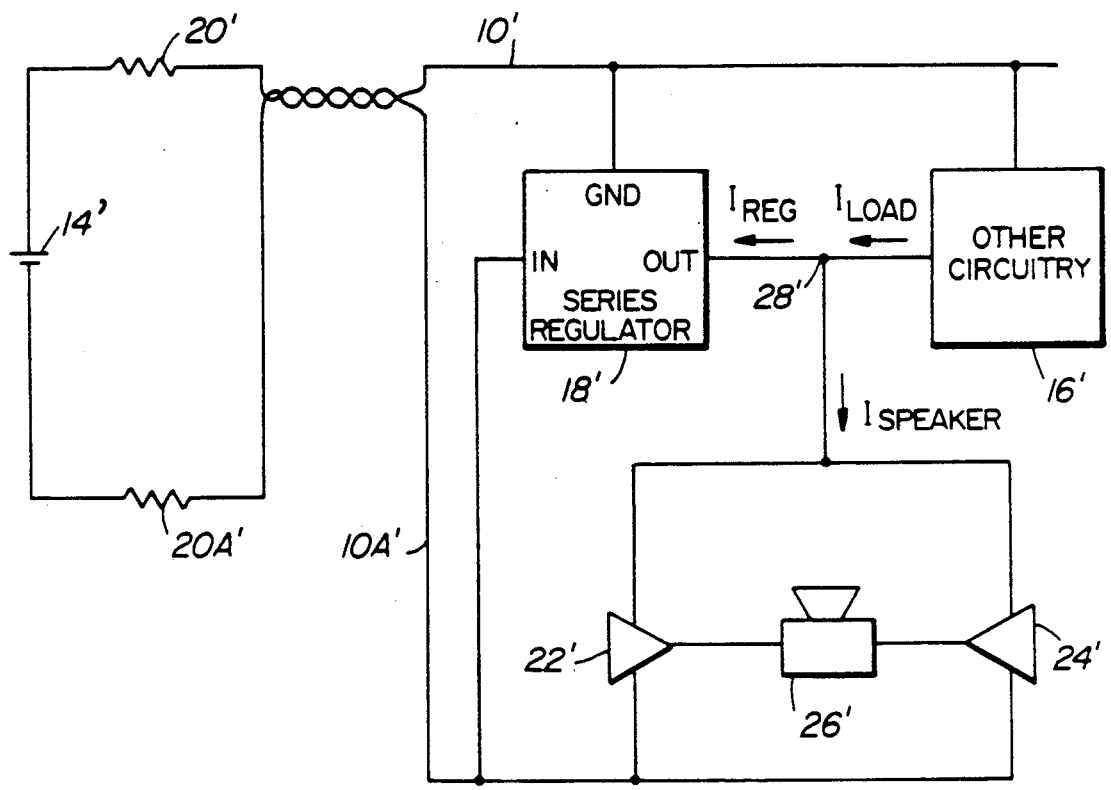
FIGS. 4 and 5 correspond to FIGS. 1 and 2 but show a configuration using a negative series regulator.

Although the foregoing description is of a telephone set using a positive series regulator, i.e. which maintains constant a voltage that is positive with respect to ground, the invention comprehends a telephone set in which a negative series regulator is used instead. Such an arrangement is illustrated in FIGS. 4 and 5, in which the components correspond to those in FIGS. 1 and 2 and so are identified by the same reference numerals but suffixed with a prime.

Figure 5:
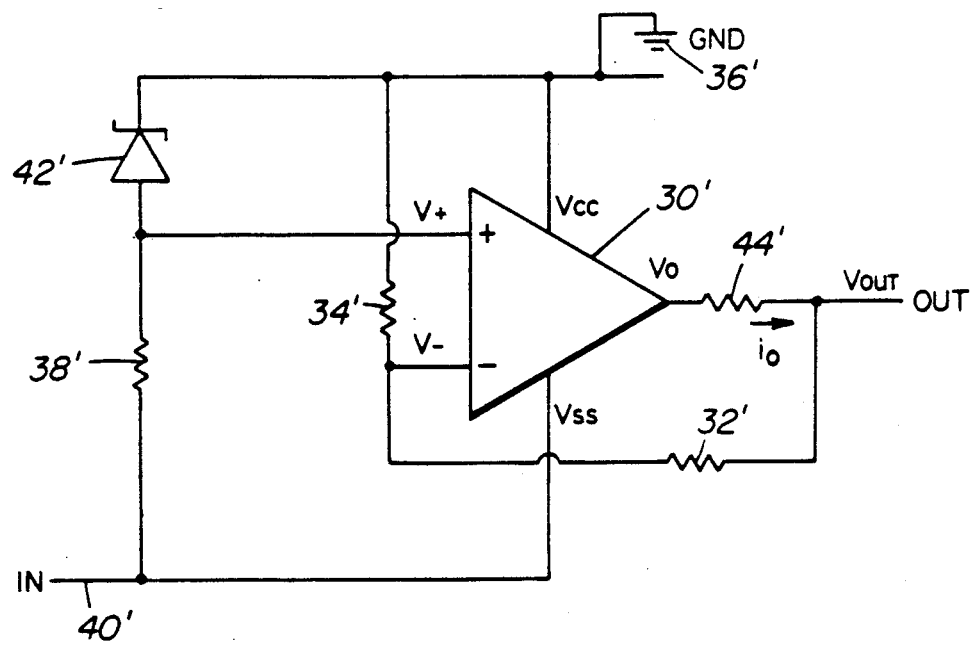

The amplifier 30' shown in FIG. 5 would have the same internal circuit as that shown in FIG. 3, but the external connections to it would differ. Thus, substituting a negative series regulator 18' involves rearranging the regulator 18', other circuitry 16', and speaker amplifiers 22' and 24', as shown in FIG. 4. The GND terminal of regulator 18' is connected to the positive line 10' and the common connection between the IN terminal of regulator 18' and the amplifiers 22' and 24' is connected to the negative line 10A'. The currents $I_{reg}$, $I_{load}$, and $I_{speaker}$ are shown reversed, as compared with FIG. 1, $I_{reg}$ flowing out of the node 28' when $I_{load}$ is greater than $I_{speaker}$. It should be noted that $I_{reg}$ will then flow out of the IN terminal of regulator 18', together with the usual bias current for the regulator 18'.

The corresponding circuit of FIG. 5 shows the ground 36' applied to the $V_{cc}$ terminal of the amplifier 30', and its terminal $V_{ss}$ connected to line 40' and hence to input terminal IN. Feedback resistor 32' and output resistance 44' are unchanged relative to FIG. 2. Resistor 34' remains connected to ground 36', and resistor 38' and reference diode 42' are exchanged, the cathode of reference diode 42' being connected to the new ground 36' and the resistor 38' being connected to the line 40'.

With this configuration, the negative series regulator will supply current when the current required by the speaker amplifiers 22' and 24' exceeds that received from the other circuitry, and absorb current when the current passing through the other circuitry is greater than that required by the speaker amplifiers 22' and 24'.

We claim:

1. A telephone set comprising first and second connecting means for connecting the set to respective wires of a subscriber line, a loudspeaker, a drive circuit for the loudspeaker, other circuitry, and a series regulator;

said series regulator having an input connected to one of said first and second connecting means, a ground terminal connected to the other of said first and second connecting means, and an output;

said other circuitry being connected between said output and said ground terminal;

said drive circuit having input and output power supply connections connected one to each of said input and said output, the series regulator, in dependence upon the difference between the currents of said drive circuit and said other circuitry, alternatively supplying and absorbing current, by way of said output to maintain a predetermined potential difference across said other circuitry.

2. A telephone set as defined in claim 1, wherein said series regulator comprises an operational amplifier with reference voltage means for maintaining a non-inverting input of said amplifier at a predetermined potential, and feedback means for applying to an inverting input of said operational amplifier a signal corresponding to the voltage at the output of said amplifier.

3. A telephone set as defined in claim 2, wherein said amplifier comprises a pair of output transistors connected to the output of said regulator, one of said output transistors being operative to supply current to said output and the other of said output transistors being operative to draw current from said output, said amplifier further comprising amplifier means for controlling operation of said output transistors alternately in dependence upon the voltage between inverting and non-inverting inputs of said amplifier.

4. A telephone set as defined in claim 3, wherein said amplifier means comprises a differential amplifier with its differential inputs connected to, respectively, said inverting and non-inverting inputs, and voltage gain amplifier means connected between said differential amplifier and said output transistors.

5. A telephone set comprising means for connecting the set to a subscriber line, a loudspeaker, a drive circuit for the loudspeaker, other circuitry, and a series regulator having an input and an output connected in series between the connecting means and said other circuitry, said drive circuit having input and output power supply connections connected in parallel with said input and output of said series regulator such that the output of the series regulator and one of said input and output power supply connections of said drive circuit are connected in common to said other circuitry, wherein said series regulator has a positive output and is operative to supply current to the other circuitry when current required by of the other circuitry exceeds current received from the drive circuit, and to absorb current from the drive circuit when the current from the drive circuit exceeds current required by the other circuitry.

6. A telephone set comprising means for connecting the set to a subscriber line, a loudspeaker, a drive circuit for the loudspeaker, other circuitry, and a series regulator having an input and an output connected in series between the connecting means and said other circuitry, said drive circuit having input and output power supply connections connected in parallel with said input and output of said series regulator such that the output of the series regulator and one of said input and output power supply connections of said drive circuit are connected in common to said other circuitry, wherein said series regulator has a negative output and is operative to supply current to the drive circuit when current required by of the drive circuit exceeds current received from the other circuitry, and to absorb current from the other circuitry when the current from the other circuitry exceeds current required by the drive circuit.

7. A telephone set comprising first and second connecting means for connecting the set to respective wires of a subscriber line, load circuitry and other circuitry, said other circuitry requiring a regulated power supply, and a series regulator having an input connected to one of said first and second connecting means, a ground terminal connected to the other of said first and second connecting means, and an output, said other circuitry being connected between said output and said ground of said series regulator, said load circuit having input and output power supply connections connected one to each of the input and output of said series regulator, the series regulator being operable in dependence upon the difference between the current of said load circuit and the current of said other circuitry to supply and absorb current, alternatively, by way of its said output so as to maintain a predetermined potential difference across said other circuitry.

8. A telephone set comprising first and second connecting means for connecting the set to respective wires of a subscriber line, a loudspeaker, a drive circuit for the loudspeaker, other circuitry, and a series regulator;

said series regulator having an input connected to one of said first and second connecting means, a ground terminal connected to the other of said first and second connecting means, and an output;

said other circuitry being connected between said output and said ground terminal;

said drive circuit having input and output power supply connections connected one to each of said input and said output, the series regulator, in dependence upon the difference between the currents of said drive circuit and said other circuitry, alternatively supplying and absorbing current, by way of said output to maintain a predetermined potential difference across said other circuitry; and wherein said series regulator comprises an operational amplifier with reference voltage means for maintaining a non-inverting input of said amplifier at a predetermined potential, and feedback means for applying to an inverting input of said operational amplifier a signal corresponding to the voltage at the output of said amplifier.

9. A telephone set as recited in claim 8, wherein said amplifier comprises a pair of output transistors connected to the output of said regulator, one of said output transistors being operative to supply current to said output and the other of said output transistors being operative to draw current from said output, said amplifier further comprising amplifier means for controlling operation of said output transistors alternately in dependence upon the voltage between inverting and non-inverting inputs of said amplifier.

10. A telephone set as recited in claim 9, wherein said amplifier means comprises a differential amplifier with its differential inputs connected to, respectively, said inverting and non-inverting inputs, and voltage gain amplifier means connected between said differential amplifier and said output transistors.

* * * * *